(12) United States Patent
Chitrapu et al.

(10) Patent No.: US 7,944,884 B2
(45) Date of Patent: May 17, 2011

(54) VOICE AND DATA COMMUNICATION SERVICES USING ORTHOGONAL SUB-CHANNELS

(75) Inventors: Prabhakar R. Chitrapu, Blue Bell, PA (US); Behrouz Aghili, Melville, NY (US); Marian Rudolf, Montreal (CA); Stephen G. Dick, Nesconset, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 116 days.

(21) Appl. No.: 12/257,568

(22) Filed: Oct. 24, 2008

(65) Prior Publication Data

US 2009/0141782 A1    Jun. 4, 2009

Related U.S. Application Data

(60) Provisional application No. 60/982,167, filed on Oct. 24, 2007, provisional application No. 61/097,670, filed on Sep. 17, 2008.

(51) Int. Cl.
*H04W 4/12* (2009.01)
*H04W 72/04* (2009.01)
*H04J 11/00* (2006.01)
*H04J 4/00* (2006.01)
*H04L 12/66* (2006.01)

(52) U.S. Cl. ........ 370/330; 370/208; 370/345; 370/352; 455/450

(58) Field of Classification Search .......... 370/203–210, 370/330, 342, 328, 331, 352–356, 329, 343, 370/345; 375/219, 260; 455/450, 414.2
See application file for complete search history.

(56) References Cited

U.S. PATENT DOCUMENTS

| | | | | |
|---|---|---|---|---|
| 5,533,013 | A * | 7/1996 | Leppanen | 370/342 |
| 6,553,021 | B1 * | 4/2003 | Bishop et al. | 370/347 |
| 7,039,029 | B2 * | 5/2006 | Lee et al. | 370/335 |
| 7,082,311 | B2 * | 7/2006 | Hefner et al. | 455/456.1 |
| 7,489,664 | B2 * | 2/2009 | Kim et al. | 370/335 |
| 7,702,289 | B2 * | 4/2010 | Tzavidas et al. | 455/69 |
| 2005/0083893 | A1 * | 4/2005 | Purkayastha et al. | 370/338 |
| 2005/0185733 | A1 | 8/2005 | Tolli et al. | |
| 2005/0201382 | A1 * | 9/2005 | Xue et al. | 370/395.21 |

(Continued)

FOREIGN PATENT DOCUMENTS

WO    98/26625    6/1998

(Continued)

OTHER PUBLICATIONS

Nokia, "Voice Capacity Evolution With Orthogonal Sub Channel," 3GPP TSG-GERAN Meeting #33, GP-070214, (Seoul, South Korea, Feb. 12-16, 2007).

(Continued)

*Primary Examiner* — Kwang B Yao
*Assistant Examiner* — Candal Elpenord
(74) *Attorney, Agent, or Firm* — Volpe and Koenig, P.C.

(57) ABSTRACT

A method for using orthogonal sub-channels (OSCs) in a wireless transmit/receive unit (WTRU). A capability report is received from the WTRU, including an indication whether the WTRU supports OSCs. A determination is made whether to use OSCs for the WTRU and the result of the determination is signaled to the WTRU. If OSCs are used with the WTRU, the signaling includes an OSC assignment for the WTRU. In one embodiment, two resources are assigned to the WTRU and each resource is assigned to a different OSC.

14 Claims, 2 Drawing Sheets

U.S. PATENT DOCUMENTS

2007/0014265 A1* 1/2007 Casaccia .............. 370/337
2008/0049683 A1* 2/2008 Nakamata et al. ........ 370/335
2008/0287104 A1* 11/2008 Sundberg et al. ....... 455/412.1

FOREIGN PATENT DOCUMENTS

WO   2005/117379   12/2005
WO   2009/036389   3/2009

OTHER PUBLICATIONS

"Orthogonal Sub Channel (OSC)," 3GPP TSG-GERAN Meeting #35, GP-071547, (Dublin, Ireland, Aug. 27-31, 2007).

Third Generation Partnership Project, "Technical Specification Group GSM/EDGE Radio Access Network; Radio subsystem link control" (Release 7), 3GPP TS 45.008 V7.9.0 (Sep. 2007).

Third Generation Partnership Project, "Technical Specification Group GSM/EDGE Radio Access Network; Radio subsystem link control" (Release 7), 3GPP TS 45.008 V7.12.0 (Sep. 2008).

Third Generation Partnership Project, "Technical Specification Group GSM/EDGE Radio Access Network; Radio subsystem link control" (Release 7), 3GPP TS 45.008 V8.0.0 (Sep. 2008).

Meng et al., "Sub-Carrier Assignment for Multimedia Traffic Over OFDM Wireless Channel," International Conference on Wireless Communications, Networking and Mobile Computing, pp. 1-4 (Sep. 22-24, 2006).

* cited by examiner

VOICE AND DATA COMMUNICATION SERVICES USING ORTHOGONAL SUB-CHANNELS

CROSS REFERENCE TO RELATED APPLICATIONS

This application claims the benefit of U.S. Provisional Application No. 60/982,167, filed Oct. 24, 2007 and U.S. Provisional Application No. 61/097,670, filed Sep. 17, 2008, which are incorporated by reference as if fully set forth herein.

FIELD OF INVENTION

The present invention is related to wireless communication systems.

BACKGROUND

The concept of using orthogonal sub-channels (OSC), also referred to as Multiple Users Reusing One Timeslot (MUROS), for doubling voice capacity was previously introduced. The OSC concept allows the network to multiplex two wireless transmit/receive units (WTRUs) that are allocated the same radio resource. The sub-channels are separated by using non-correlated training sequences. The first sub-channel can use existing training sequences, and the second sub-channel can use new training sequences for both the downlink and the uplink. Alternatively, only new training sequences or only existing training sequences can be used on the sub-channels. Using OSC can double voice capacity with negligible impact to WTRUs and networks. OSC can transparently be applied for all Gaussian minimum shift keying (GMSK) modulated traffic channels (e.g., for full rate traffic channels (TCH/F), half rate traffic channels (TCH/H), a related slow associated control channel (SACCH), and a fast associated control channel (FACCH)).

One current goal with MUROS is to increase the voice capacity of the system. For example, the voice capacity can be increased by having two circuit switched voice channels (i.e., two separate calls) on the same radio resource. By changing the modulation of the signal from GMSK to QPSK (where one symbol maps to two bits), it is relatively easy to separate two users—one user on the X axis of the constellation and a second user on the Y axis of the constellation. The network sends only one signal, but it contains information for two different sub-channels (users).

In the downlink, the OSC concept can be realized in the transmitter of a base station (BS) using a quadrature phase shift keying (QPSK) constellation that may be, e.g., a subset of an 8-PSK constellation used for enhanced general packet radio service (EGPRS). Modulating bits are mapped to QPSK symbols ("dibits") so that the first sub-channel (OSC-0) is mapped to the most significant bit (MSB) and the second sub-channel (OSC-1) is mapped to the least significant bit (LSB). Both sub-channels may use individual ciphering algorithms, e.g., A5/1 or A5/3. Several options for symbol rotation may be considered and optimized by different criteria. For instance, a symbol rotation of $3\pi/8$ would be as in EGPRS, a symbol rotation of $\pi/4$ would make it like $\pi/4$-QPSK, and a symbol rotation of $\pi/2$ can provide sub-channels to imitate GMSK. Alternatively, the QPSK signal constellation can be designed so that it appears like a legacy GMSK modulated symbol sequence on at least one sub-channel, e.g., it is legacy compliant.

Another method to realize the OSC concept in the downlink is to multiplex two WTRUs together by transmitting two individual GMSK modulated bursts per timeslot. Interference-cancellation type receivers can be used for reasonable demodulation performance in the presence of the other multiplexed user. It is not precluded that at least one multiplexed user employs a conventional type of equalizer receiver.

In the uplink, each WTRU can use a normal GMSK transmitter with an appropriate training sequence. The BS typically employs interference cancellation or joint detection type of receivers, such as a space time interference rejection combining (STIRC) receiver or a successive interference cancellation (SIC) receiver, to receive the orthogonal sub-channels used by different WTRUs.

Typically, during the OSC mode of operation, the BS applies downlink and uplink power control with a dynamic channel allocation (DCA) scheme to keep the difference of received downlink and/or uplink signal levels of co-assigned sub-channels within, e.g., a ±10 dB window, although the targeted value may depend on the type of receivers multiplexed together and other criteria.

The basic OSC or MUROS concept may or may not be operated in conjunction with Frequency-Hopping or User Diversity schemes, either in the DL, in the UL, or both. For example, on a per-frame basis, the sub-channels may be allocated to different pairings of users, and pairings on a per-timeslot basis may be recurring in patterns over prolonged period of times, such as several frame periods or block periods. The ideas presented herein apply equally to these modifications of the baseline OSC or MUROS concepts.

The OSC or MUROS concept has been proposed to increase voice capacity in a GSM system. However, while voice is an important multiplexing case, GSM/EGPRS systems in practice also rely on more sophisticated service multiplexing scenarios, such as packet switched (PS) services through GPRS/EGPRS, simultaneous support of voice and data through DTM, and so on. Unless the MUROS concept can be extended to also allow for operation in these additional service scenarios, its benefits are confined to voice channel multiplexing only. Therefore, it would be desirable to explore other advantageous applications of the OSC concept.

SUMMARY

One limitation of legacy GSM/EGPRS technology is that it uses multislot classes and limits the number of simultaneous receive, transmit, or receive/transmit timeslots per frame, because each timeslot can only contain one burst. This limits the achievable data rates in the GSM system, and indirectly reduces capacity, multiplexing gains, and artificially incurred access or transmission delays due to waiting for a transmission or reception opportunity. Methods and procedures are sought to improve upon these aspects.

The MUROS concept has the potential to offer more solutions than just increasing voice capacity. For illustration purposes and where applicable, the methods described are explained in terms of sub-channels, OSC-0 and OSC-1, which can be realized by using, for example, QPSK-type modulation.

In a first embodiment, the individual sub-channels (OSC-0 and OSC-1) realized through the OSC or MUROS concepts are used to convey data channels such as used for GPRS or EGPRS communications in the PS domain. The individual sub-channels available per timeslot can be allocated to either one user or more than one user. For example, the sub-channel OSC-0 can carry the PDTCH of a first user, while the second sub-channel carries the PDTCH of a second user. Or, the first sub-channel carries a first PDTCH of a first user, or data portion of a data block, while the second sub-channel carries a second PDTCH, or data portion of a data block, of the first user.

In a second embodiment, the individual sub-channels (OSC-0 and OSC-1) are separately used for voice and data communications. The voice services may be offered on circuit switched (CS) connections or PS connections. Similarly, the data services may be offered on either a CS or a PS connection. Voice and data services offered on the sub-channels may belong to different users or to the same user. The latter case specifically addresses dual transfer mode (DTM). The partitioning and allocating services between voice and data is used in conjunction with various embodiments of physical layer multiplexing.

BRIEF DESCRIPTION OF THE DRAWINGS

A more detailed understanding of the invention may be had from the following description of a preferred embodiment, given by way of example and to be understood in conjunction with the accompanying drawings wherein.

DETAILED DESCRIPTION

Figure 1:
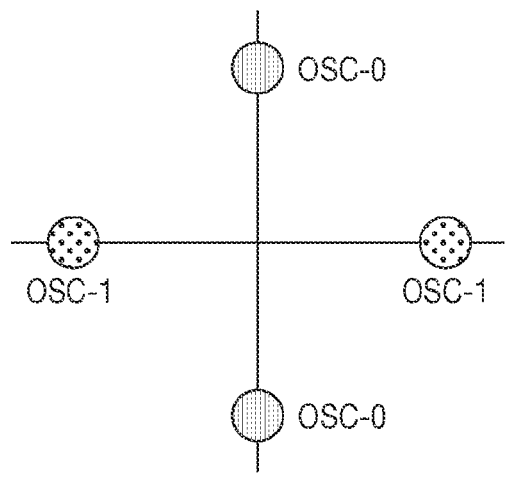
FIG. 1 shows two OSCs as sub-channels of a QPSK modulation constellation.

When referred to hereafter, the term "wireless transmit/receive unit (WTRU)" includes, but is not limited to, a user equipment (UE), a mobile station, a fixed or mobile subscriber unit, a pager, a cellular telephone, a personal digital assistant (PDA), a computer, or any other type of user device capable of operating in a wireless environment. When referred to hereafter, the term "base station" includes, but is not limited to, a Node B, a site controller, an access point (AP), or any other type of interfacing device capable of operating in a wireless environment.

In a first embodiment, the individual sub-channels (OSC-0 and OSC-1) realized through the OSC or MUROS concepts are used to convey data channels such as used for GPRS or EGPRS communications in the PS domain. The individual sub-channels available per timeslot can be allocated to either one user or more than one user. For example, the sub-channel OSC-0 can carry the PDTCH of a first user, while the second sub-channel carries the PDTCH of a second user. Or, the first sub-channel carries a first PDTCH of a first user, or data portion of a data block, while the second sub-channel carries a second PDTCH, or data portion of a data block, of the first user.

In a second embodiment, the individual sub-channels (OSC-0 and OSC-1) are separately used for voice and data communications. The voice services may be offered on circuit switched (CS) connections or PS connections. Similarly, the data services may be offered on either a CS or a PS connection. Voice and data services offered on the sub-channels may belong to different users or to the same user. The latter case specifically addresses dual transfer mode (DTM). The partitioning and allocating services between voice and data is used in conjunction with various embodiments of physical layer multiplexing.

In a first state-of-the-art DTM mode, one resource (e.g., one timeslot) is used half of the time for a voice call and half of the time for packet data. Specifically, the half-rate (HR) mode of DTM operation allocates a CS timeslot every second frame, while the same timeslot in intermittent frames is used for the PS data of that user. For example, a user can have a voice call while downloading e-mail in the background. Because it only uses each resource for half of the time, DTM in HR mode effectively lowers the throughput in the PS domain. The OSC or MUROS concept is applied to this mode of DTM operation by using a first sub-channel on a subset of frames to carry CS voice for the user, while a second sub-channel on another subset of frames is used to carry PS data for the same user. For example, OSC-0 is used on timeslot #2 of all even-numbered frames to carry CS voice, while OSC-0 on timeslot #2 of all odd-numbered frames is used to carry PS data in the DTM configuration. In DTM HR mode, when voice frames are carried in a half-rate CS traffic channel (TCH/H) and packet data is carried in a half-rate packet data traffic channel (PDTCH/H), using two half-rate channels enables both channels to be transmitted in a single timeslot.

Alternatively to DTM HR mode, DTM can also be used in multiple timeslots mode, in which one full-rate TCH and one or more adjacent full-rate PDTCHs are used. This mode of DTM operation requires more than one transmit timeslot and/or more than one receive timeslot per frame, e.g., multislot operation. The OSC or MUROS concept is applied to this DTM mode of operation by allocating a varying number of sub-channels to timeslots to carry a user's CS voice and PS data. For example, a first sub-channel is used on a first timeslot to carry CS voice. A second sub-channel is used on a second timeslot to carry PS data for the same user. The second sub-channel on the second timeslot may or may not be multiplexed with another user's CS voice or PS data communication. More than one timeslot or sub-channel may be used per period (e.g., frame) to carry the PS data. For example, if timeslot #2 using OSC-0 carries a user's CS voice, timeslot #3 and timeslot #4 using OSC-1 carry that user's PS data. As is obvious to one skilled in the art, the concept is flexible and extendable to encompass various numbers of timeslot combinations.

However, one user can take advantage of MUROS if the WTRU is MUROS-capable. The WTRU signals its MUROS capabilities (i.e., whether it supports MUROS) to the network. The network decides whether the WTRU will be able to use MUROS and communicates the decision in the assignment phase. In one implementation, the decision is included in an extension to the existing assignment message. When the network assigns a voice traffic channel (generally, a resource), it informs the WTRU that it is a MUROS assignment and indicates which sub-channel is reserved for the WTRU.

The network makes the decision whether or not to use MUROS for a particular WTRU. It is noted that using MUROS increases the interference generated, so this may be a factor against using MUROS for a particular WTRU. The network can perform a balancing as to whether to apply MUROS for a particular WTRU. These network-side decisions are implementations left to the network operators, including what thresholds and what criteria to evaluate.

In one implementation, a voice call is put on one sub-channel while a packet data call is put on a second sub-channel. The voice call is established in the current manner and at the same time, the second sub-channel is used for packet data.

The MUROS scenario can be applied to a single user by assigning two different resources to the same user. It is possible to assign two parallel CS connections for the same user, so that one CS connection is used for a voice call and the other CS connection is used for a data call (e.g., a modem to modem connection). Using two parallel CS connections would be permitted even if no PS connection is allowed.

The WTRU can transmit without modification. Since the base station receives two bursts at almost exactly the same time, the base station needs a way to distinguish between the two bursts. The base station can use interference cancellation to determine which burst is coming from which WTRU. The base station receives two approximately simultaneous bursts from two different sources and can separate them into two different channels. How the network specifically addresses the uplink scenario is implementation specific.

The modulation in the UL and the DL are different. In the UL, the WTRU uses GMSK, same as before. With MUROS, two WTRUs are transmitting to the base station at the same time. One way to identify the different WTRUs transmitting in the same burst is to use different training sequences (midambles). The training sequences are signaled to the respective WTRUs on the channel and are orthogonal to each other, to minimize the interference generated by the simultaneous transmissions.

On the DL, the base station sends one burst with QPSK modulation, in which one symbol indicates two bits of information. There needs to be a way to identify to each WTRU which bits belong to it. In one implementation, the most significant bits belong to one WTRU and the least significant bits belong to the second WTRU. The training sequence is the same for both WTRUs on the DL, as only one burst is sent.

Voice and Data Communications

In a first embodiment, individual sub-channels (OSC-0 and OSC-1) are separately used for voice and data communications. The voice services may be offered on CS connections or PS connections. Similarly, the data services may be offered on either a CS or a PS connection. Voice and data services offered on the sub-channels may belong to different users or to the same user. The partitioning and allocating services between voice and data is used in conjunction with various embodiments of physical layer multiplexing.

For example, a first user is allocated sub-channel OSC-0 using a CS voice traffic channel, and a second user on the multiplexed OSC-1 sub-channel uses a PS data traffic channel. Either one or both users can use full-rate or half-rate configurations. In a second example, a first user is allocated sub-channel OSC-0 using a CS voice traffic channel, and the second sub-channel OSC-1 (or specific occurrences of it) carries PS data as in DTM operation. In a third example, a first user is allocated one sub-channel to carry both voice and data traffic channels. A second user is allocated the second sub-channel. In a fourth example, the sub-channels carry both voice and data traffic (SMS constitutes a special case of data traffic) or a combination of these two. As becomes apparent from these examples, many configurations of this concept can be applied.

In a second embodiment, an extension of the physical layer multiplexing concept is proposed. FIG. 1 shows one example wherein the OSCs are realized as sub-channels of a QPSK modulation constellation. It is noted that OSC-0 and OSC-1 are shown on the x-axis and y-axis of the constellation as examples. It will be understood by one of skill in the art that the symbols may exist at any points in the constellation; however, to maintain the orthogonality between OSC-0 and OSC-1, the constellation points will appear as a square.

Figure 2:
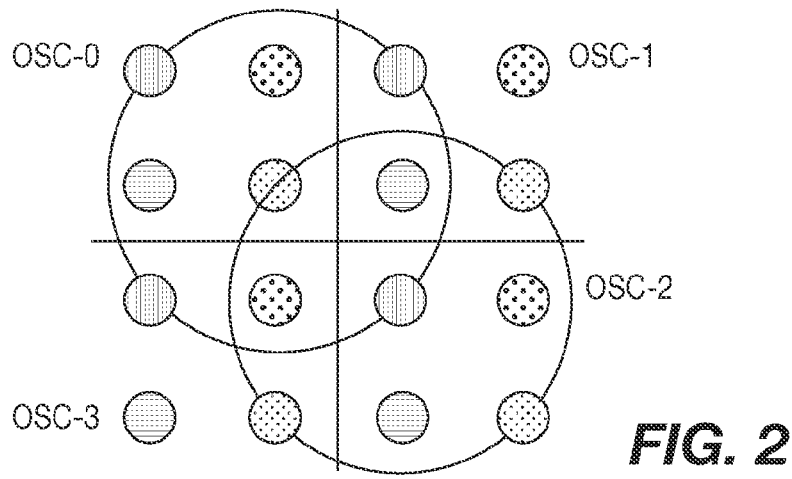
FIG. 2 shows four OSCs as sub-channels of a 16-QAM modulation constellation.

In a third embodiment, sub-channels are defined in terms of selected sub-groups of constellation points. FIG. 2 shows an example of a 16-QAM modulation, in which four OSCs are defined. This case offers more flexibility to allocate varying amounts of energy to each sub-constellation. For example, in FIG. 2, the individual channels have same average symbol energy.

Orthogonal Sub-Channels with Different Symbol Energy

Figure 3:
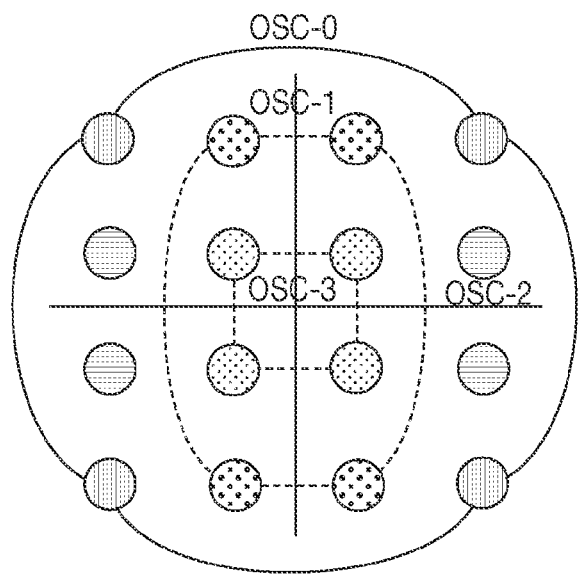
FIG. 3 shows an alternative implementation of four OSCs as sub-channels of a 16-QAM modulation constellation.

In a second definition of the OSCs, the sub-channels have different amounts of average symbol energy compared to each other. In FIG. 3 (also a 16-QAM modulation), OSC-0 has the highest average symbol energy, OSC-1 and OSC-2 have the next highest average symbol energy, and OSC-3 has the least amount of average symbol energy, as shown by the respective locations in the constellation.

In this case, an adaptive allocation of the sub-channels to users is advantageous. For example, the sub-channel with highest average symbol energy is assigned to a user whose channel is most attenuated, as compared to the channel of the other users. The sub-channel with the least average symbol energy is assigned to the user whose channel is least attenuated. As the user moves, a dynamic channel re-assignment is made to further optimize the radio resource utilization. In one embodiment, the channel assignment is via an assignment command or a handover command.

Another application of unequal energy sub-channels is the simultaneous provisioning of data streams of varying quality of service (QoS) requirements. The data stream with the more stringent QoS requirements is mapped onto the sub-channel with higher symbol energy and vice versa.

One other application, for the case of single user, applies CS voice and CS data for the same user on the same physical channel on a full rate basis. This is a different approach from DTM, where the user is in a CS connection and a PS connection simultaneously on a half rate basis. The assigned data channel could, for example, be one of the 14.4, 9.6, or 4.8 kbps channels defined for GSM CS data. The only requirement is that the WTRU is capable of QPSK modulation and de-modulation, or any equivalent MUROS modulation scheme that can provide two or more sub-channels per timeslot.

Another possibility for the single user case is multiplexing two CS applications. Assuming that the most important CS application is voice, the scenario could be that the user has been assigned a channel for CS voice according to the legacy procedures. At this point, the network is aware of the WTRU capability as it was signaled during the call set-up signaling phase. If the WTRU and the network need to communicate about another application, that can be set-up using CS resources and the network can assign an OSC channel configuration to this WTRU. Examples of other CS services, to run in parallel with the voice service, could be mobile originated as well as terminated SMS, unstructured supplementary service data (USSD), and so forth.

For example, a user that receives and transmits voice on a traffic channel can be assigned a second sub-channel to carry supplementary signaling messages, SMS, USSD, or the like without "stealing" voice resources or waiting for appropriate transmission opportunities in the GSM multi-frames. This improves upon link robustness for the first traffic channel, while reducing transmission latencies and limited capacity for this data type. It is noted that the current GSM system design supports the transfer of SMS and USSD data. However, a drawback with the current solutions is that both the WTRU and the network need to convey the information on top of the voice information. This leads to stealing voice resources by using the FACCH in some cases and using the SACCH for reasons other than sending the "Measurement Reports and System Information". Stealing voice resources reduces the voice quality, whereas using the SACCH for other purposes impacts the link performance when SMS messages are concatenated.

Single User with Parallel Applications

Concentrating on the single user approach, a few solutions for transmitting two parallel applications, e.g., voice and CS data, in the UL direction are proposed.

1. Mandating QPSK. The most straightforward solution is to mandate QPSK modulation in the UL for the WTRU and QPSK demodulation at the BS in case of a single user channel assignment.

The following solutions can be used when the WTRU does not support QPSK modulation in the UL or the BS cannot demodulate QPSK.

2. Use of Discontinuous Transmission. Since the user, and therefore the WTRU, is on average silent during half of the voice conversation, the WTRU and the network take advantage of the silent periods and apply Discontinuous Transmission (DTX). In GSM, when DTX is active, the WTRU sends Silent Descriptors (SID) over pre-defined frame numbers. In general, the WTRU sends eight SID frames during one SACCH frame, i.e., 104 TDMA frames. This means that the WTRU utilizes 12 frames out of 104 available frames when DTX is active. As there are also four Idle frames in the 104 frames, there are 104−16=88 frames available. Therefore, all or a subset of the 88 frames can be used by the WTRU for CS data transmission in the UL.

3. Using Two Training Sequences. Another solution uses two training sequences instead of one. The BS assigns a channel in OSC configuration to the WTRU as a single user. For the UL, the WTRU is assigned two different training sequences with separate Training Sequence Codes (TSC). As an example, when the WTRU sends voice information, it uses the first training sequence on its transmitted bursts. When the WTRU switches to sending CS data, it applies the second training sequence on the bursts. This solution simplifies the detection mechanism at the BS.

4. Capability Indication. When the WTRU indicates its OSC capability to the network, it also indicates that the single user channel assignment can only be supported in the DL (and not in the UL). This means that the WTRU can receive CS data in the DL in parallel with voice, but cannot send voice and CS data in parallel in the UL. By extension, the same signaling capability can be applied to differentiate between simultaneous CS/CS or CS/PS voice/data support in the DL, the UL, or the DL and UL. In one realization, this capability is signaled through an extension or delta with respect to the multislot class capabilities indicated by a WTRU for voice services, (E)GPRS, or DTM.

Exemplary WTRU and BS

Figure 4:
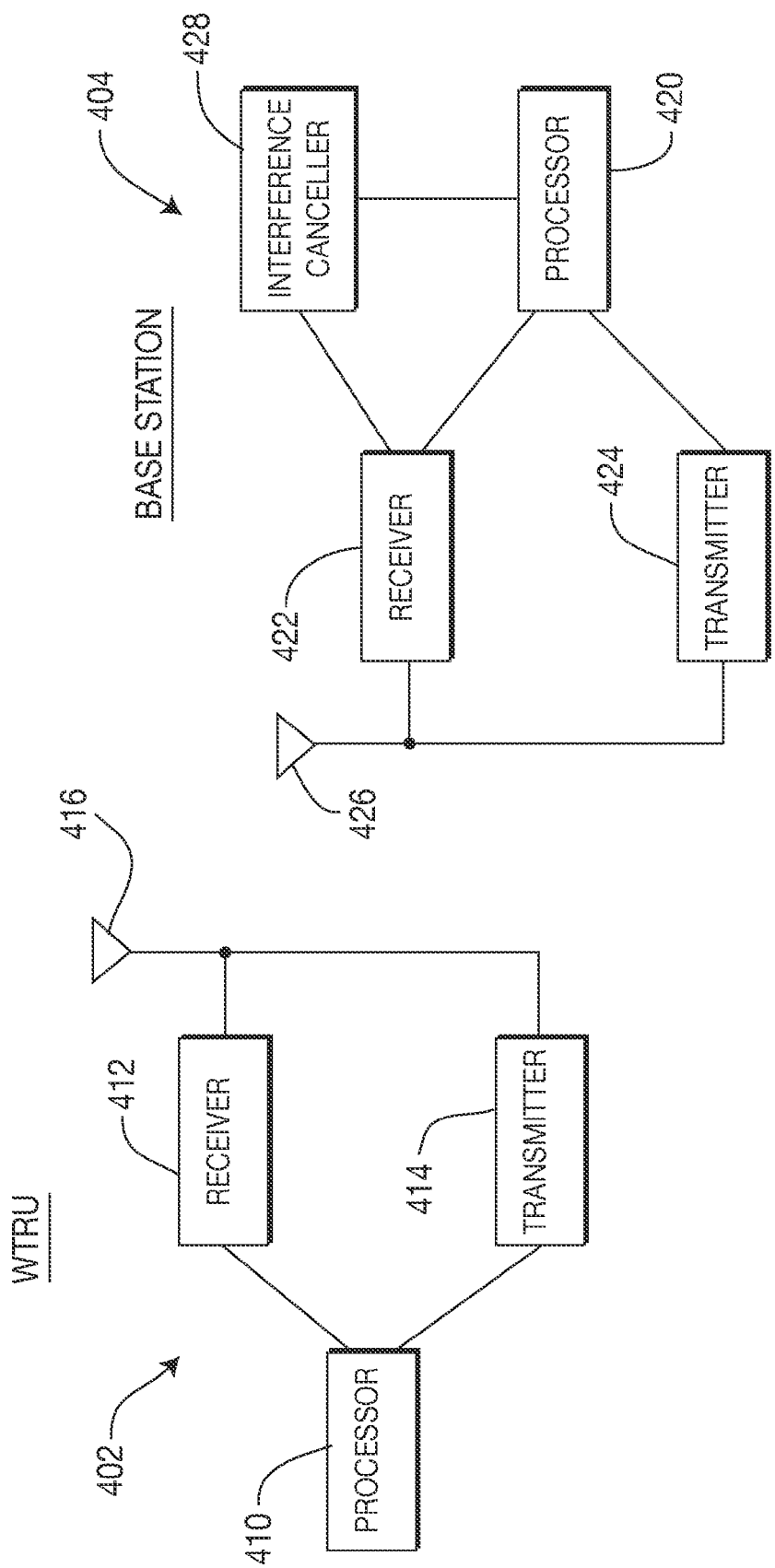
FIG. 4 is a block diagram of a WTRU and a base station configured to implement OSCs.

FIG. 4 is a block diagram of a WTRU 402 and a BS 404 configured to implement OSCs. In addition to the components that may be found in a typical WTRU, the WTRU 402 includes a processor 410, a receiver 412, a transmitter 414, and an antenna 416. The processor 410 is configured to transmit multiple OSCs on the UL and to receive multiple OSCs on the DL. The receiver 412 and the transmitter 414 are in communication with the processor 410. The antenna 416 is in communication with both the receiver 412 and the transmitter 414 to facilitate the reception and transmission of wireless data.

In addition to the components that may be found in a typical BS, the BS 404 includes a processor 420, a receiver 422, a transmitter 424, an antenna 426, and an interference canceller 428. The processor 420 is configured to transmit multiple OSCs on the DL and to receive multiple OSCs on the UL. The receiver 422 and the transmitter 424 are in communication with the processor 420. The antenna 426 is in communication with both the receiver 422 and the transmitter 424 to facilitate the reception and transmission of wireless data. The interference canceller 428 is used to permit the BS 404 to simultaneously receive two UL signals from a WTRU.

Although the features and elements of the present invention are described in the preferred embodiments in particular combinations, each feature or element can be used alone without the other features and elements of the preferred embodiments or in various combinations with or without other features and elements of the present invention. The methods or flow charts provided in the present invention may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

What is claimed is:

1. A method for use in a network based on Global System for Mobile Communications (GSM) Enhanced Data Rates for GSM Evolution (EDGE) Radio Access network (GERAN) technology, the method comprising:
receiving capability information from a wireless transmit/receive unit (WTRU) that indicates whether the WTRU supports GERAN Orthogonal Sub-Channels (OSCs), wherein GERAN OSCs are implemented by multiplexing multiple WTRUs onto a single GERAN timeslot using a phase-shift-keying (PSK) modulation scheme;
determining whether the WTRU should communicate using a GERAN OSC sub-channel based on:
the capability information; and
at least one factor, other than WTRU supports GERAN OSCs and
in response to a determination that the WTRU should communicate using the GERAN OSC sub-channel, transmitting an assignment message to the WTRU that indicates that the WTRU should communicate using the GERAN OSC.

2. The method of claim 1, further comprising:
assigning two different resources to the WTRU.

3. The method of claim 2, further comprising:
assigning a first resource of the two different resources to the GERAN OSC, and assigning a second resource of the two different resources to a second GERAN OSC.

4. The method of claim 2, wherein the two different resources include two circuit switched (CS) connections.

5. The method of claim 4, further comprising:
reserving a first resource of the two different resources for a voice call and reserving a second resource of the two different resources for a data call.

6. The method of claim 2, wherein the two different resources include a circuit switched connection and a packet switched connection.

7. The method of claim 2, wherein the two different resources include a voice call and a data transmission.

8. A system for use in a network based on Global System for Mobile Communications (GSM) Enhanced Data Rates for GSM Evolution (EDGE) Radio Access network (GERAN) technology, the system comprising:
a receiver configured to receive capability information from a wireless transmit/receive unit (WTRU) that indicates whether the WTRU supports GERAN Orthogonal Sub-Channels (OSCs),
wherein GERAN OSCs are implemented by multiplexing multiple WTRUs onto a single GERAN timeslot using a phase-shift-keying (PSK) modulation scheme;
a processor configured to determine whether the WTRU should communicate using a GERAN OSC sub-channel based on:
the capability information; and
at least one factor, other than whether the WTRU supports GERAN OSCs; and
a transmitter configured to send an assignment message to the WTRU in response to a determination that the WTRU should communicate using the GERAN OSC, wherein the assignment message indicates that the WTRU should communicate using the GERAN OSC.

9. The system of claim 8, wherein the processor is configured to assign two different resources to the WTRU.

10. The station system of claim 9, wherein the processor is configured to assign a first resource of the two different resources to the GERAN OSC, and to assign a second resource of the two different resources to a second GERAN OSC.

11. The system of claim 9, wherein the different two resources include two circuit switched (CS) connections.

12. The system of claim 11, wherein the processor is configured to reserve a first resource of the two different resources for a voice call and reserve a second resource of the two different resources for a data call.

13. The system of claim 9, wherein the two different resources include a circuit switched connection and a packet switched connection.

14. The system of claim 9, wherein the two different resources include a voice call and the a data transmission.

* * * * *

UNITED STATES PATENT AND TRADEMARK OFFICE
CERTIFICATE OF CORRECTION

PATENT NO. : 7,944,884 B2
APPLICATION NO. : 12/257568
DATED : May 17, 2011
INVENTOR(S) : Chitrapu et al.

It is certified that error appears in the above-identified patent and that said Letters Patent is hereby corrected as shown below:

At claim 1, column 8, line 61, after "than" insert --whether the--.

At claim 1, column 8, line 62, after "OSCs" insert --;--.

At claim 10, column 10, line 14, delete "station".

At claim 14, column 10, line 29, delete "the".

Signed and Sealed this
Twenty-sixth Day of July, 2011

David J. Kappos
*Director of the United States Patent and Trademark Office*